US011422896B2

(12) United States Patent
Kotary et al.

(10) Patent No.: US 11,422,896 B2
(45) Date of Patent: Aug. 23, 2022

(54) TECHNOLOGY TO ENABLE SECURE AND RESILIENT RECOVERY OF FIRMWARE DATA

(71) Applicant: Intel Corporation, Santa Clara, CA (US)

(72) Inventors: Karunakara Kotary, Portland, OR (US); Sean Dardis, Hillsboro, OR (US); Michael Kubacki, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 16/833,166

(22) Filed: Mar. 27, 2020

(65) Prior Publication Data

US 2020/0226028 A1    Jul. 16, 2020

(51) Int. Cl.
    *G06F 11/20*    (2006.01)
    *G06F 11/14*    (2006.01)
    *G06F 12/06*    (2006.01)

(52) U.S. Cl.
    CPC ...... *G06F 11/1433* (2013.01); *G06F 12/0646* (2013.01); *G06F 2201/82* (2013.01); *G06F 2201/84* (2013.01); *G06F 2212/1008* (2013.01)

(58) Field of Classification Search
    CPC ............. G06F 11/1433; G06F 11/1417; G06F 11/1423; G06F 11/1666; G06F 2201/82; G06F 2201/84; G06F 21/572; G06F 9/4401; G06F 11/2074; G06F 11/2079
    See application file for complete search history.

(56) References Cited

U.S. PATENT DOCUMENTS

| | | | | |
|---|---|---|---|---|
| 6,182,187 B1* | 1/2001 | Cox | ....................... | G06F 9/4403 711/5 |
| 6,185,134 B1* | 2/2001 | Tanaka | ................ | G11C 11/5621 365/185.33 |
| 6,185,696 B1* | 2/2001 | Noll | ........................ | G11C 29/74 714/11 |
| 6,757,838 B1* | 6/2004 | Chaiken | ................ | G06F 9/4403 714/15 |
| 2005/0160217 A1* | 7/2005 | Gonzalez | ............ | G06F 11/1068 711/6 |
| 2005/0210233 A1* | 9/2005 | Tang | ......................... | G06F 8/65 713/100 |
| 2011/0022826 A1* | 1/2011 | More | ........................ | G06F 1/26 713/1 |

(Continued)

OTHER PUBLICATIONS

Wikipedia's CMOS historical version published Mar. 4, 2020 https://en.wikipedia.org/w/index.php?title=CMOS&oldid=943906844 (Year: 2020).*

(Continued)

*Primary Examiner* — Joseph O Schell

(74) *Attorney, Agent, or Firm* — Jordan IP Law, LLC

(57) ABSTRACT

Systems, apparatuses and methods may provide for technology that conducts a first copy of firmware data from a first partition in a storage device to a second partition in the storage device, detects a recovery condition with respect to the firmware data in the first partition, and automatically conducts a second copy of the firmware data from the second partition to the first partition in response to the recovery condition. In one example, the firmware data defines one or more settings for firmware code.

21 Claims, 7 Drawing Sheets

(56) References Cited

U.S. PATENT DOCUMENTS

| | | | |
|---|---|---|---|
| 2013/0055019 A1* | 2/2013 | Zhou | G06F 11/1417 |
| | | | 714/21 |
| 2018/0157839 A1* | 6/2018 | Pearson | H04L 9/083 |
| 2019/0042229 A1 | 2/2019 | Kotary et al. | |
| 2020/0293306 A1* | 9/2020 | Hung | G06F 3/0634 |
| 2021/0240488 A1* | 8/2021 | Suryanarayana | G06F 9/4406 |
| 2021/0240831 A1* | 8/2021 | Oncale | G06F 9/4406 |

OTHER PUBLICATIONS

A. Regenscheid, "Platform Firmware Resiliency Guidelines," National Institute of Standards and Technology Special Publication 800-193, May 2018, 45 pages.

HP Development Company, L.P., "HP Sure Start: Automatic firmware intrusion detection and repair," HP Technical White Paper, Jan. 2019, 19 pages.

\* cited by examiner

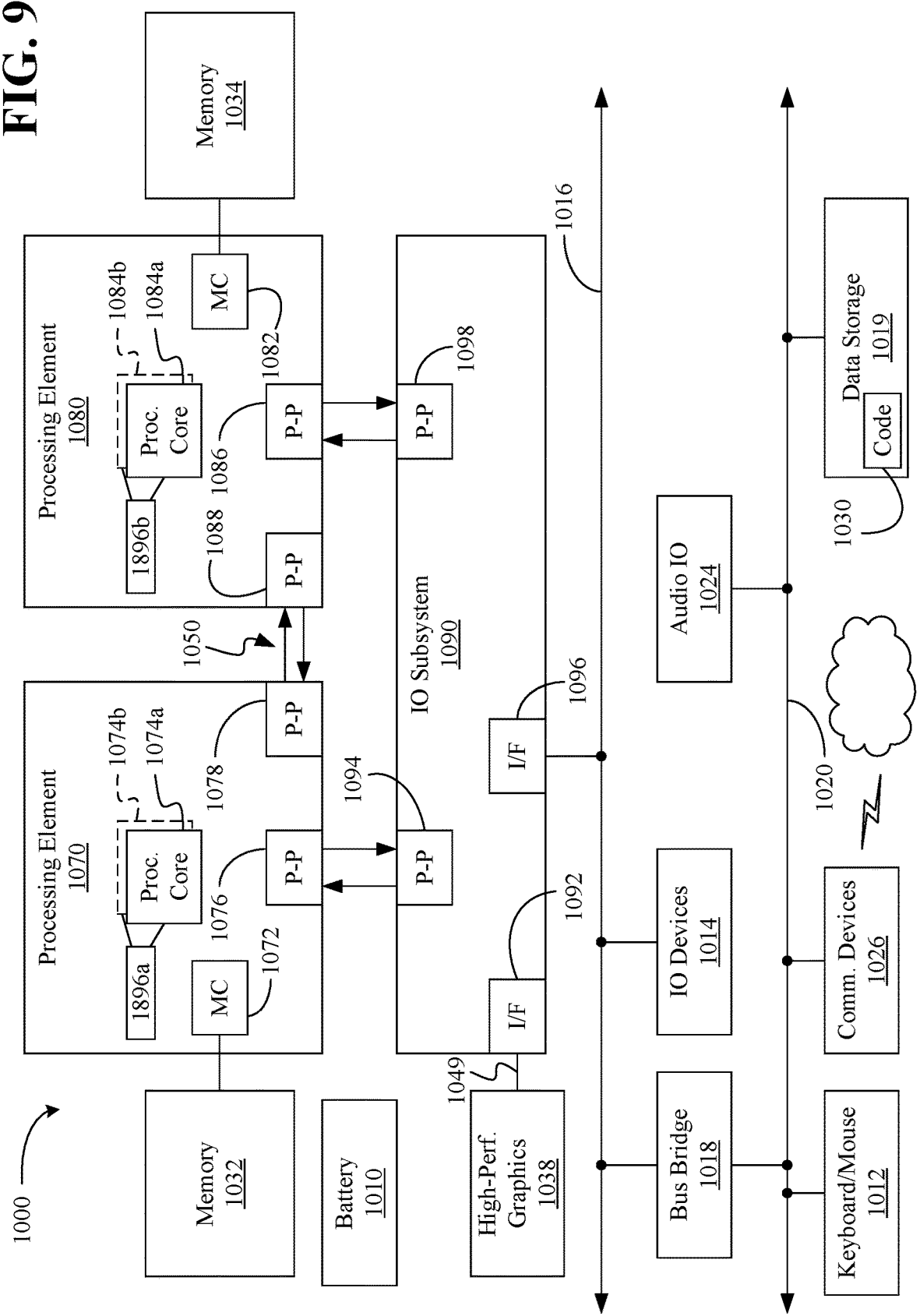

US 11,422,896 B2

TECHNOLOGY TO ENABLE SECURE AND RESILIENT RECOVERY OF FIRMWARE DATA

TECHNICAL FIELD

Embodiments generally relate to data recovery. More particularly, embodiments relate to technology that enables secure and resilient recovery of firmware data.

BACKGROUND

Firmware code (e.g., low level instructions that facilitate the control of device hardware) may be used to perform a variety of operations such as BIOS (basic input/output system), management, embedded controller (EC) and/or other operations in a computing system. Firmware code typically has associated data (e.g., firmware data) that defines programmable aspects of the firmware code. During operation, the firmware data may change over time from the "factory state" to reflect a personalized execution of the firmware code. Errors and/or intentional attacks on the computing system may call for the recovery of a trusted version of the firmware code. In such a case, an information technology (IT) or original equipment manufacturer (OEM) professional may manually revert the firmware data back to the factory state, which results in increased cost, reduced performance and/or a negative user experience.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an example of a multi-processor based computing system according to an embodiment.

DESCRIPTION OF EMBODIMENTS

Figure 1:
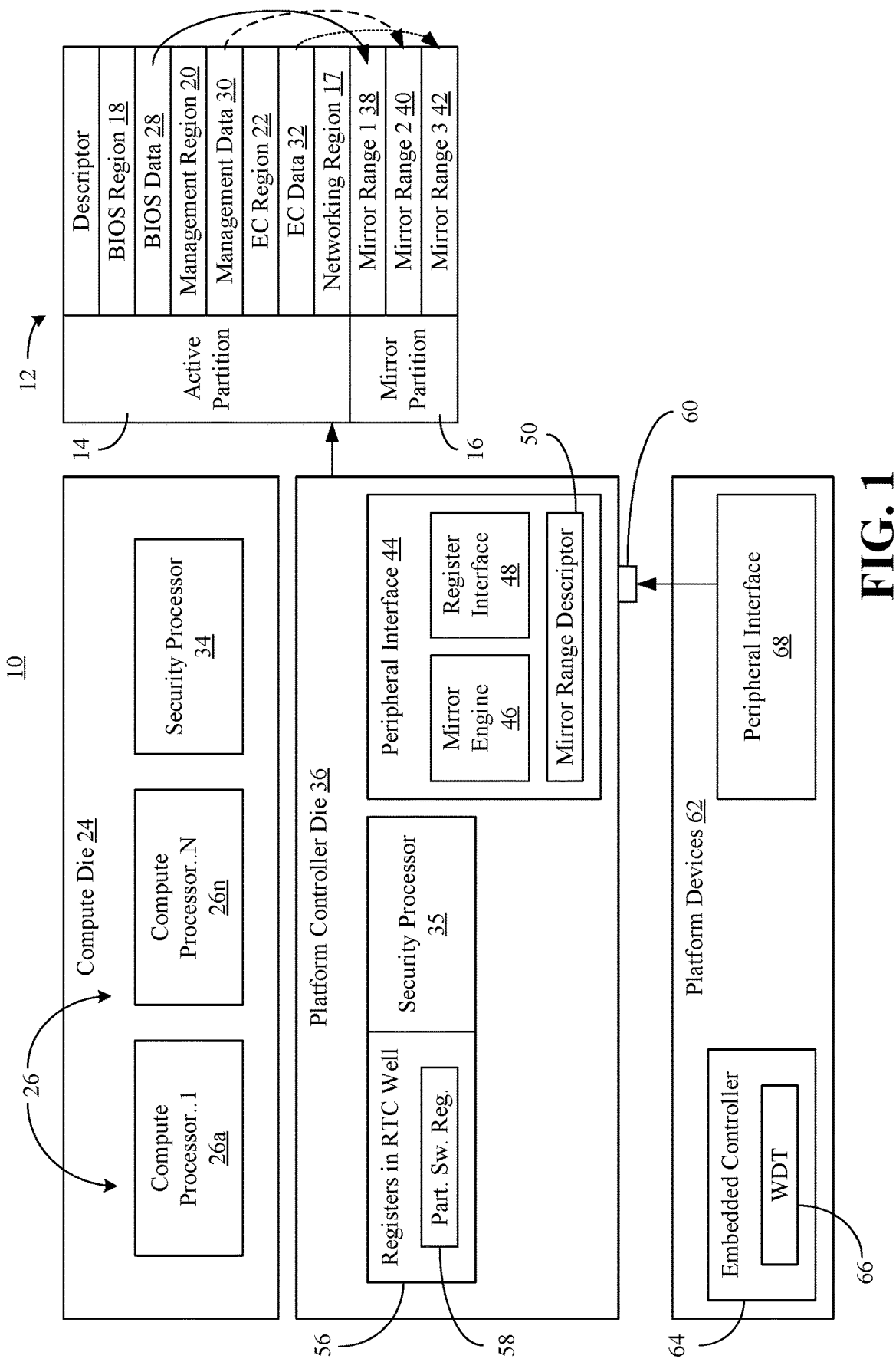
FIG. 1 is a block diagram of an example of a recovery architecture according to an embodiment.

Turning now to FIG. 1, a recovery architecture 10 is shown in which a non-volatile storage device 12 (e.g., flash memory, serial peripheral interface NOR/SPINOR memory, NAND storage) contains an active partition 14 (e.g., contiguous memory cell area) and a mirror partition 16 (e.g., contiguous memory cell area). In general, the active partition 14 is used to store working copies of firmware code and firmware data. For example, the firmware code might include BIOS firmware (e.g., unified extensible firmware interface/UEFI instructions) stored in a BIOS region 18, management firmware stored in a management (e.g., manageability engine/ME) region 20, EC firmware stored in an EC region 22, and so forth. In an embodiment, the firmware data defines one or more settings for the firmware code. In the illustrated example, BIOS data 28 defines settings (e.g., boot preferences) for the firmware code in the BIOS region 18, management data 30 defines settings (e.g., remote access preferences) for the firmware code in the management region 20, EC data 32 defines settings (e.g., low power microcontroller settings) for the firmware code in the EC region 22, and so forth. The active partition 14 may also include a networking region 17 (e.g., Gigabit Ethernet/GBE).

As will be discussed in greater detail, the mirror partition 16 may be used to store recovery copies of the firmware data in the active partition 14. For example, a first mirror range 38 might store a recovery (e.g., redundant) copy of the BIOS data 28, a second mirror range 40 may store a recovery copy of the management data 30, a third mirror range 42 might store a recovery copy of the EC data 32, and so forth. Recovery copies of other firmware data such as, for example, compute security engine (CSE), trusted platform module (TPM) and/or active management technology (AMT) data may also be stored in the mirror partition 16. Storing the recovery copies of the firmware data in the mirror partition 16 as shown provides a number of advantages. For example, if an error and/or intentional attack on the architecture 10 is detected, the firmware data may be recovered along with a trusted version of the firmware code. As a result, reverting of the firmware data back to the factory state may be avoided, which results in lower cost, enhanced performance and/or a more positive user experience. Additionally, security is improved because working and recovery code and data are isolated from one another. Moreover, cost savings may be further achieved by incorporating the active partition 14 and the mirror partition 16 into the same storage device 12 (e.g., rather than separate SPINOR devices).

In the illustrated example, a compute die 24 includes a plurality of compute processors 26 (26a-26n) and a security processor 34. The compute processors 26 may use the BIOS data 28 to execute the firmware code stored in the BIOS region 18 and perform system boot, platform device and/or security operations. In an embodiment, the security processor 34 uses the management data 30 to execute the firmware code stored in the management region 20. In one example, the security processor 34 also uses the EC data 32 to execute the firmware code stored in the EC region 22. Indeed, the security processor 34 may execute CSE, TPM, AMT and/or other firmware code to ensure overall security.

The illustrated architecture 10 also includes a platform controller die 36 (e.g., platform controller hub/PCH, input/output module/IOM) having a peripheral interface 44 (e.g., serial peripheral interface/SPI, enhanced SPI/eSPI) and a security processor 35, which may also use the management data 30 to execute the firmware code stored in the management region 20 and use the EC data 32 to execute the firmware code stored in the EC region 22. Indeed, the security processor 35 may execute CSE, TPM, AMT and/or other firmware code to ensure overall security. The peripheral interface 44 may include a mirror engine 46, a register interface 48, and a mirror range descriptor section 50. The mirror ranges 38, 40, 42 may be identified in a variable length descriptor list as an extension to a traditional pre-existing SPI flash descriptor region (e.g., Flash Descriptor Region 0—the first 4 KB of the SPI flash). For example, the mirror range descriptor section 50 might reside at the end of a data structure such as, for example, Table I below.

TABLE I

| Section name | Start address | Descriptor location |
| --- | --- | --- |
| Signature | 0x10 | |
| Component | 0x30 | FLMAP0.FCBA = 0x3 (Flash Component Base Address) |
| Regions | 0x40 | FLMAP0.FRBA = 0x4 (Flash Region Base Address) |
| Masters | 0x80 | FLMAP1.FMBA = 0x8 (Flash Masters Base Address) |
| PCH straps | 0x80 | FLMAP1.FPSBA = 0x10 (Flash PCH Strap Base Address) |
| CPU straps | FLMAP1.FPSBA + FLMAP1.PSL | FLMAP2.FCPUSBA = 0x30 (Flash CPU Straps Base Address) |
| Register Init | FLMAP1.FCPUSBA + FLMAP1.CPUSL | FLMAP2.RIBA = 0x34 (Register Init Base Address) |
| Mirror Range Descriptors | FLMAP2.REBA + FLMAP2.RIL | FLMAP3.MRBA = 0xXX (Mirror Range Base Address) |

Figure 2:
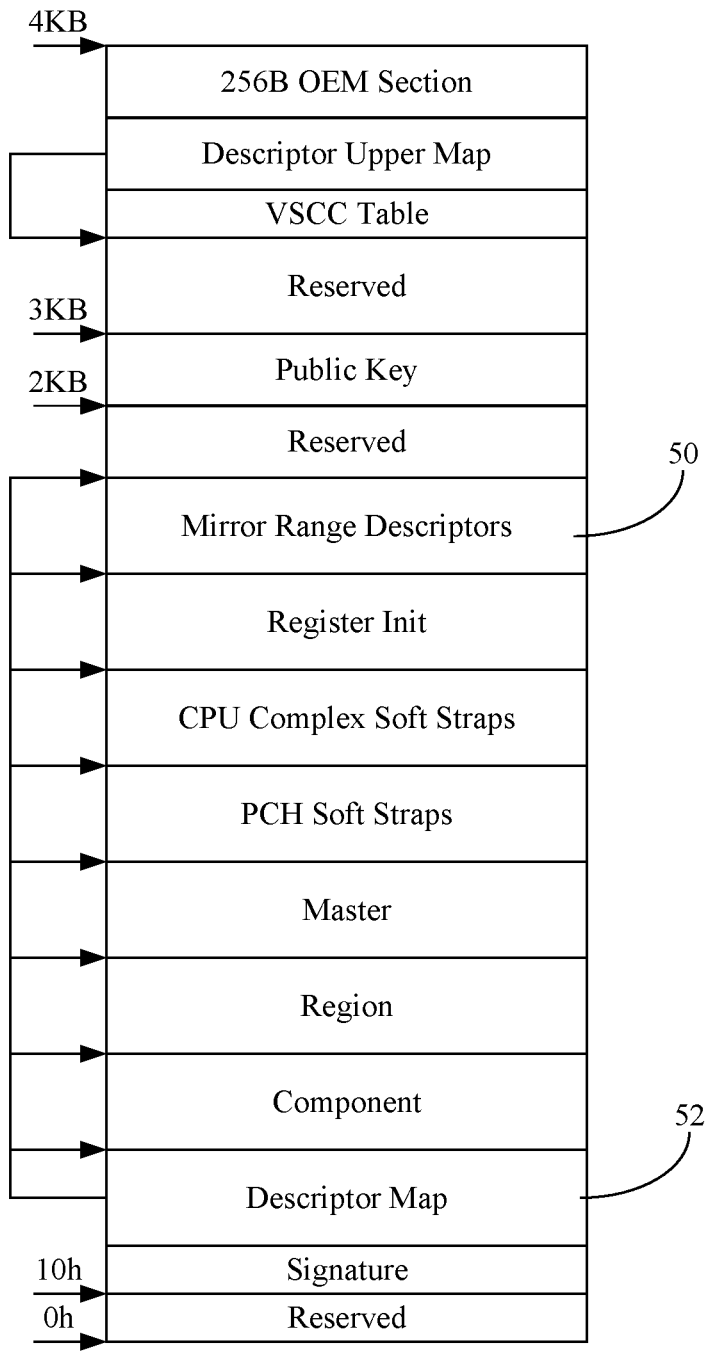
FIG. 2 is a block diagram of an example of a mirror range descriptor section according to an embodiment.

With continuing reference to FIGS. 1 and 2, a global SPI flash descriptor map 52 may include an entry to the mirror range descriptor section 50, which contains a variable length list of mirror range descriptors (e.g., the list length is platform-dependent). In an embodiment, each mirror range descriptor describes active range flash linear address (FLA), the active range limit, the mirror range FLA, and the mirror range limit. In other embodiments, the mirror range FLA and limit are omitted from the mirror range descriptors.

All flash accesses to the active ranges and the mirror ranges 38, 40, 42 may follow pre-existing support defining flash master access permissions. Additionally, direct writes to the mirror ranges 38, 40, 42 by software may be prohibited. In an embodiment, the mirror ranges 38, 40, 42 are only writeable by SPI flash controller hardware when the active region that is mapped to the mirror range 38, 40, 42 receives a write.

An implementation may choose to allow hardware to be assigned to the mirror ranges 38, 40, 42 or to require the mirror ranges 38, 40, 42 to be specified in the descriptor section 50. In either case, the active range is specified and the range covered does not cross regions (e.g. BIOS and converged security and management engine/CSME).

In one example, the mirror range descriptor section 50 is not modifiable at runtime and is consumed by the peripheral interface 44 upon initialization. Thus, the mirror engine 46 may automatically copy data written to the regions 18, 20, 22 in the active partition 14 to a corresponding mirror region in the mirror partition 16. Additionally, the register interface 48 may be used in software control flows to interact with the mirror engine 46 based on the mirror range descriptor section 50. In an embodiment, the platform controller die 36 also includes a plurality of registers 56 in a real time clock (RTC) well, where at least one of the registers 56 is a partition switch register 58 (e.g., status register). Accordingly, the partition switch register 58 may be used to trigger (e.g., in response to a recovery condition such as, for example, an error or a malicious software attack) the recovery of the firmware data in the mirror partition 16. The firmware data recovery may also be triggered via a partition switch pin 60 (e.g., user interface pin) on the platform controller die 36.

In an embodiment, the architecture 10 also includes one or more platform devices 62 such as, for example, an embedded controller 64, a baseboard management controller (BMC, not shown), or other external agent. The illustrated embedded controller 64 includes a watchdog timer (WDT) 66 that may also trigger the firmware data recovery. In such a case, the embedded controller 64 might communicate with the platform controller die 36 via an external peripheral interface 68 and the partition switch pin 60.

Figure 3:
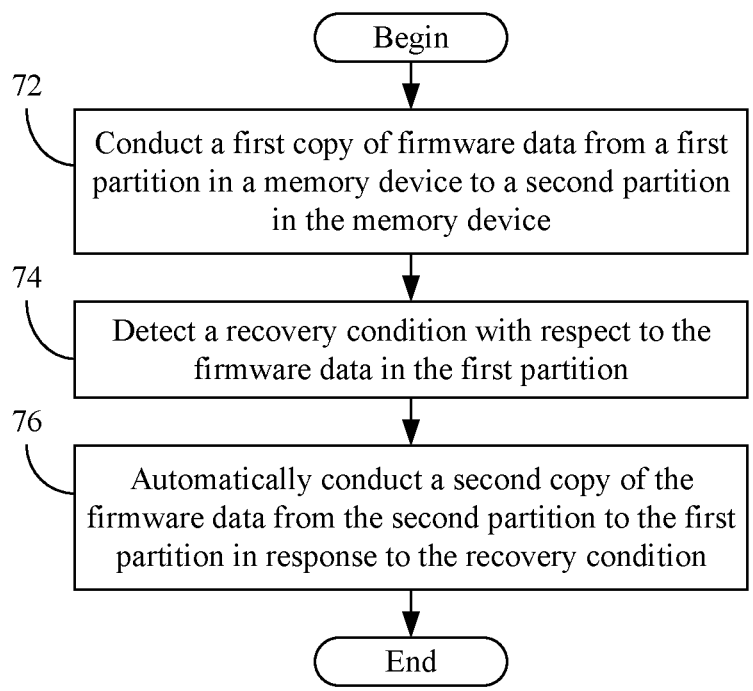
FIG. 3 is a flowchart of an example of a method of synchronizing firmware data between partitions according to an embodiment.

FIG. 3 shows a method 70 of synchronizing firmware data between partitions. The method 70 may generally be implemented in a mirror engine such as, for example, the mirror engine 46 (FIG. 1), already discussed. More particularly, the method 70 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 70 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 72 provides for conducting a first copy of firmware data from a first (e.g., active) partition in a storage device to a second (e.g., mirror) partition in the storage device. As already noted, the firmware data may define one or more settings such as, for example, BIOS settings, management settings, EC settings, security settings, etc., for executable firmware code. Moreover, block 72 may be conducted in response to a write of the firmware data to the first partition. In an embodiment, block 72 includes determining an address range for the firmware data in the second partition based on a range descriptor, wherein the firmware data is copied to the address range in the second partition during the first copy.

Block 74 detects a recovery condition with respect to the firmware data in the first partition. As already noted, the recovery condition might correspond to an error (e.g., alpha particle-induced flash storage failure), a malicious firmware update, etc., or any combination thereof. In an embodiment, the recovery condition is detected via one or more of a user interface pin or a status register. Illustrated block 76 provides for conducting a second copy of the firmware data from the second partition to the first partition in response to the recovery condition.

Storing a recovery copy of the firmware data in the second partition as shown provides a number of advantages. For example, if an error and/or intentional attack on the firmware code is detected, the firmware data may be recovered along with a trusted version of the firmware code. As a result, reverting of the firmware data back to the factory state may be avoided, which results in reduced cost, enhanced performance and/or a more positive user experience.

Figure 4:
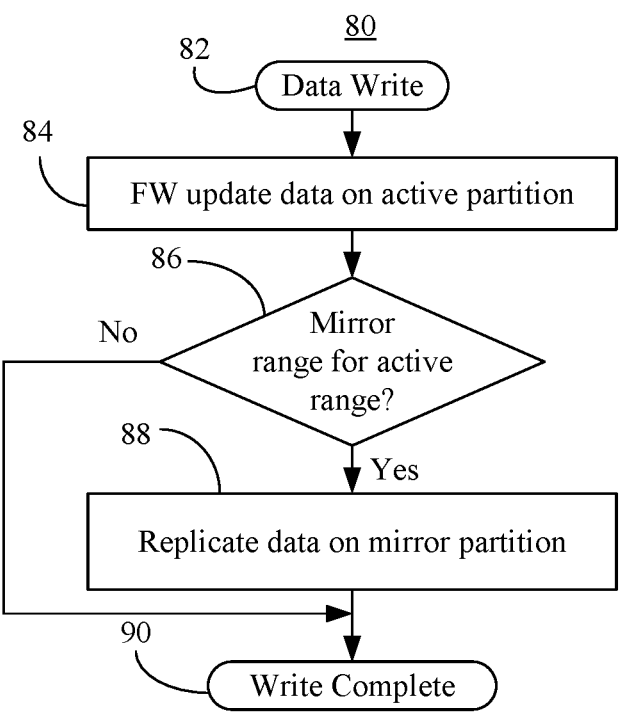
FIG. 4 is a flowchart of an example of a more detailed method of synchronizing firmware data between partitions according to an embodiment.

FIG. 4 shows a more detailed method 80 of synchronizing firmware data between partitions. The method 80 may generally be implemented in a mirror engine such as, for example, the mirror engine 46 (FIG. 1), already discussed. More particularly, the method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 82 detects a write of firmware data, where block 84 updates the firmware data in an active range on an active partition. A determination may be made at block 86 as to whether a mirror range is associated with the active range. If so, block 88 replicates the firmware data on the mirror partition. Otherwise, the method 80 bypasses block 88 and the write completes at block 90.

Figure 5:
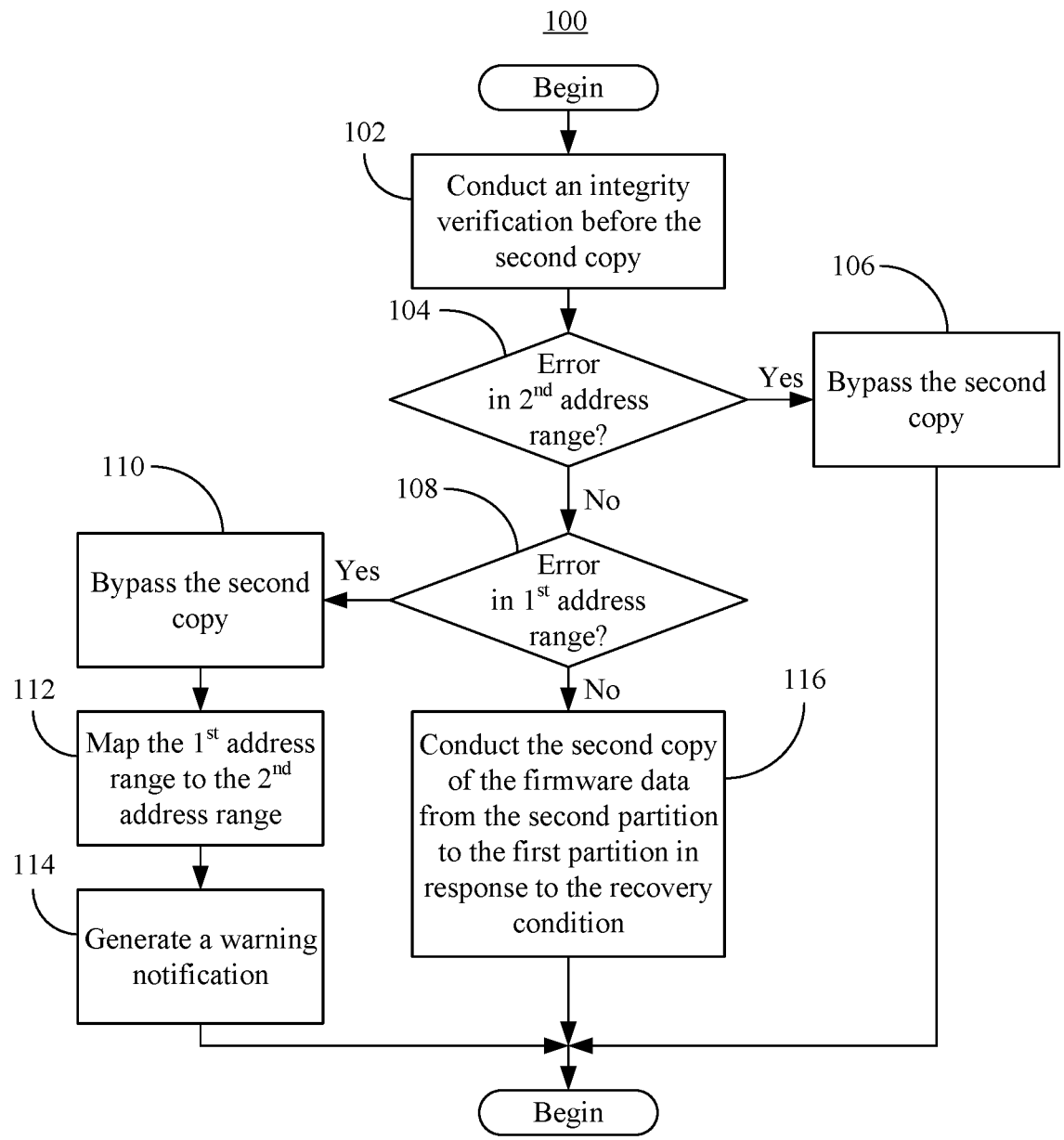
FIG. 5 is a flowchart of an example of a method of recovering firmware data according to an embodiment.

FIG. 5 shows a method 100 of recovering firmware data. The method 100 may generally be implemented in a mirror engine such as, for example, the mirror engine 46 (FIG. 1), already discussed. More particularly, the method 100 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 102 conducts an integrity verification before the second copy. The integrity verification may include retrieving the firmware data from a first address range in the first partition, retrieving the firmware data from a second address range in the second partition, and comparing the firmware data in the first partition to the firmware data in the second partition. If there is an inconsistency (e.g., no match) between the two copies of the firmware data, further analysis may be conducted to automatically determine if the inconsistency is due to an error (e.g., media transistor failure) in the first address range, an error in the second address range, or some other source. The integrity verification may therefore also include other operations such as checksum operations, and so forth.

If it is determined at block 104 that there is an error in the second address range, illustrated block 106 bypasses the second copy and the illustrated method 100 terminates. In such a case, the recovery of the firmware code may result in the factory state of the firmware data being used. If it is determined at block 104 that there is not an error in the second address range, block 108 may determine whether an error is present in the first address range. If so, block 110 provides for bypassing the second copy, where the first address range is mapped to the second address range at block 112. Accordingly, the second copy is bypassed if the integrity verification detects an error in one or more of the first address range or the second address range, in the illustrated example. In an embodiment, block 112 uses a remapping table to automatically map access to an SPI flash cell to another SPI flash cell. Thus, block 112 enables the hardware of the mirror partition to be substituted for defective and/or faulty hardware in the active partition. A warning notification may be generated at block 114 (e.g., to alert IT personnel of the active media failure).

If it is determined at block 108 that there is no error in the first address range, illustrated block 116 conducts the second copy of the firmware data from the second partition to the first partition in response to the recovery condition. The method 100 therefore further enhances performance by ensuring that the recovered firmware data is valid and the active memory range is operational.

Figure 6:
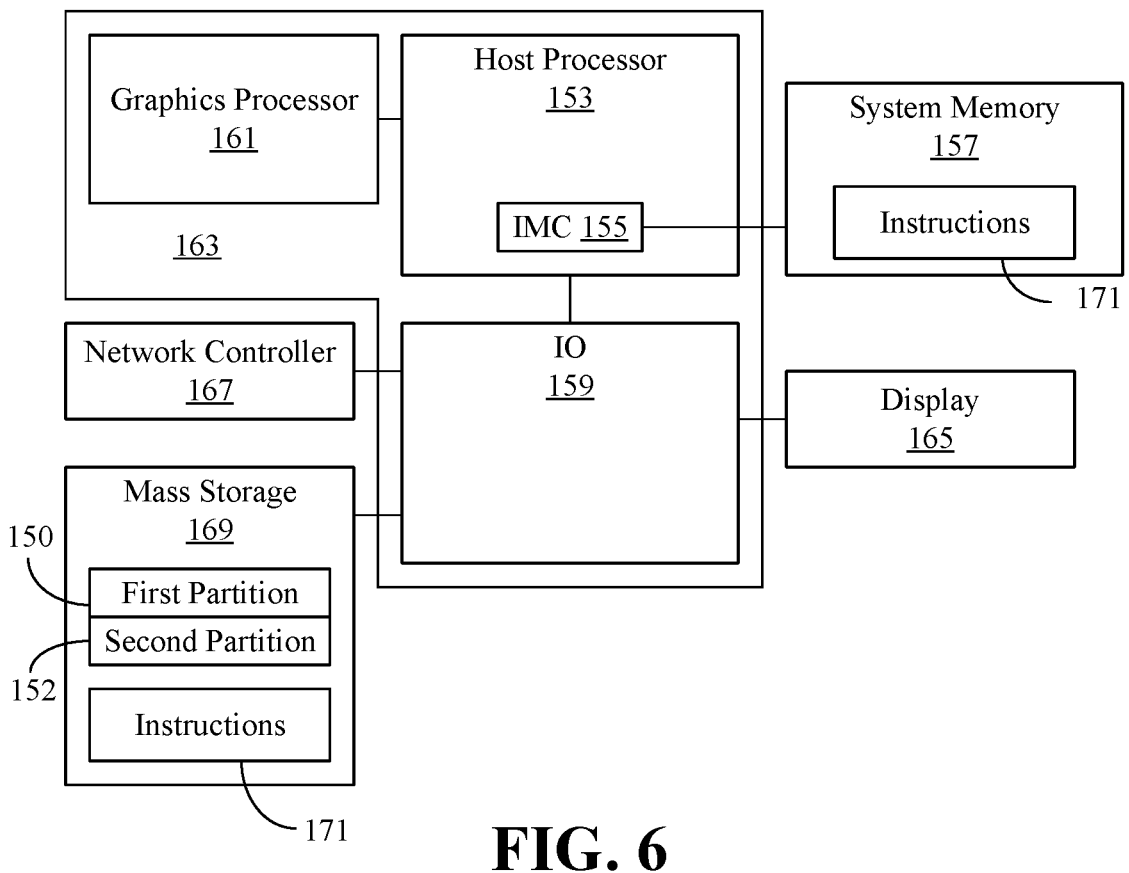
FIG. 6 is a block diagram of an example of a performance-enhanced computing system according to an embodiment.

Turning now to FIG. 6, a performance-enhanced computing system 151 is shown. The system 151 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 151 includes a host processor 153 (e.g., central processing unit/CPU) having an integrated memory controller (IMC) 155 that is coupled to a system memory 157.

The illustrated system 151 also includes an input output (TO) module 159 implemented together with the host processor 153 and a graphics processor 161 (e.g., graphics processing unit/GPU) on a semiconductor die 163 as a system on chip (SoC). The illustrated IO module 159 communicates with, for example, a display 165 (e.g., touch screen, liquid crystal display/LCD, light emitting diode/LED display), a network controller 167 (e.g., wired and/or wireless), and mass storage 169 (e.g., hard disk drive/HDD, optical disk, solid state drive/SSD, flash memory, single-headed NAND storage, multi-headed SPINOR or other non-volatile storage device). In one example, the mass storage 169 includes a first partition 150 and a second partition 152.

In an embodiment, the host processor 153, the graphics processor 161 and/or the IO module 159 execute instructions 171 retrieved from the system memory 157 and/or the mass storage 169 to perform one or more aspects of the method 70 (FIG. 3), the method 80 (FIG. 4) and/or the method 100 (FIG. 5), already discussed. Thus, execution of the illustrated instructions 171 may cause the computing system 151 to conduct a first copy of firmware data from the first partition 150 to the second partition 152, detect a recovery condition with respect to the firmware data in the first partition 150, and automatically conduct a second copy of the firmware data from the second partition 152 to the first partition 150 in response to the recovery condition. The computing system 151 is therefore considered to be performance-enhanced at least to the extent that firmware data is resilient and is securely recovered from the second partition 152 without reverting the firmware data back to the factory state. The computing system 151 also eliminates any need for a second SPINOR to store the recovery copy of the firmware data.

Figure 7:
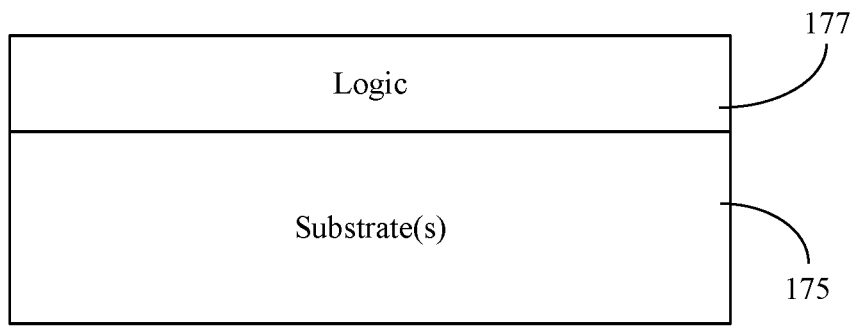
FIG. 7 is an illustration of an example of a semiconductor apparatus according to an embodiment.

FIG. 7 shows a semiconductor package apparatus 173. The illustrated apparatus 173 includes one or more substrates 175 (e.g., silicon, sapphire, gallium arsenide) and logic 177 (e.g., transistor array and other integrated circuit/IC components) coupled to the substrate(s) 175. The logic 177 may be implemented at least partly in configurable logic or fixed-functionality logic hardware. In one example, the logic 177 implements one or more aspects of the method 70

(FIG. 3), the method 80 (FIG. 4) and/or the method 100 (FIG. 5), already discussed. Thus, the logic 177 may conduct a first copy of firmware data from a first partition in a storage device to a second partition of the storage device, detect a recovery condition with respect to the firmware data in the first partition, and automatically conduct a second copy of the firmware data from the second partition to the first partition in response to the recovery condition. The apparatus 173 is therefore considered to be performance-enhanced at least to the extent that firmware data is resilient and is securely recovered from the second partition without reverting the firmware data back to the factory state.

In one example, the logic 177 includes transistor channel regions that are positioned (e.g., embedded) within the substrate(s) 175. Thus, the interface between the logic 177 and the substrate(s) 175 may not be an abrupt junction. The logic 177 may also be considered to include an epitaxial layer that is grown on an initial wafer of the substrate(s) 175.

Figure 8:
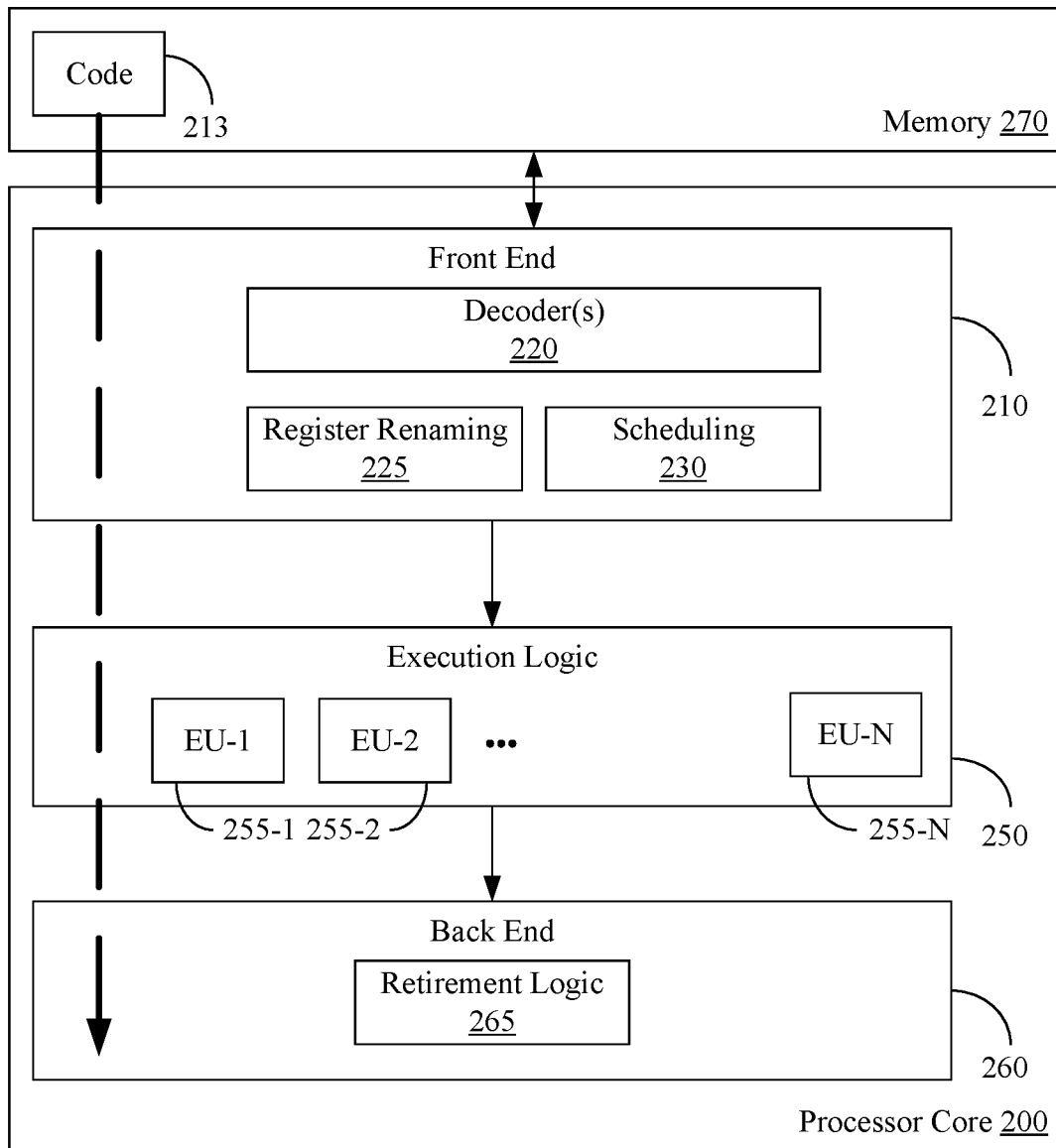
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 70 (FIG. 3), the method 80 (FIG. 4) and/or the method 100 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 70 (FIG. 3), the method 80 (FIG. 4) and/or the method 100 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 includes a performance-enhanced computing system comprising a non-volatile storage device including a first partition and a second partition, a processor, and a memory including a set of executable program instructions, which when executed by the processor, cause the processor to conduct a first copy of firmware data from the first partition to the second partition, detect a recovery condition with respect to the firmware data in the first partition, and automatically conduct a second copy of the firmware data from the second partition to the first partition in response to the recovery condition.

Example 2 includes the computing system of Example 1, wherein the firmware data is to define one or more settings for firmware code and wherein the first copy is conducted in response to a write of the firmware data to the first partition.

Example 3 includes the computing system of Example 1, wherein the instructions, when executed, further cause the processor to determine an address range for the firmware data in the second partition based on a range descriptor, and wherein the firmware data is copied to the address range in the second partition during the first copy.

Example 4 includes the computing system of Example 1, wherein the recovery condition is detected via one or more of a user interface pin or a status register.

Example 5 includes the computing system of any one of Examples 1 to 4, wherein the instructions, when executed, further cause the processor to conduct an integrity verification before the second copy, wherein the second copy is conducted if the integrity verification does not detect an error in a first address range containing the firmware data in the first partition or a second address range containing the firmware data in the second partition, and bypass the second copy if the integrity verification detects an error in one or more of the first address range or the second address range.

Example 6 includes the computing system of Example 5, wherein the instructions, when executed, further cause the processor to map the first address range to the second address range if the integrity verification detects an error in the first address range, and generate a warning notification if the integrity verification detects an error in the first address range.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to conduct a first copy of firmware data from a first partition in a storage device to a second partition in the storage device, detect a recovery condition with respect to the firmware data in the first partition, and automatically conduct a second copy of the firmware data from the second partition to the first partition in response to the recovery condition.

Example 8 includes the semiconductor apparatus of Example 7, wherein the firmware data is to define one or more settings for firmware code and wherein the first copy is conducted in response to a write of the firmware data to the first partition.

Example 9 includes the semiconductor apparatus of Example 7, wherein the logic coupled to the one or more substrates is to determine an address range for the firmware data in the second partition based on a range descriptor, and wherein the firmware data is copied to the address range in the second partition during the first copy.

Example 10 includes the semiconductor apparatus of Example 7, wherein the recovery condition is detected via one or more of a user interface pin or a status register.

Example 11 includes the semiconductor apparatus of any one of Examples 7 to 10, wherein the logic coupled to the one or more substrates is to conduct an integrity verification before the second copy, wherein the second copy is conducted if the integrity verification does not detect an error in a first address range containing the firmware data in the first partition or a second address range containing the firmware data in the second partition, and bypass the second copy if the integrity verification detects an error in one or more of the first address range or the second address range.

Example 12 includes the semiconductor apparatus of Example 11, wherein the logic coupled to the one or more substrates is to map the first address range to the second address range if the integrity verification detects an error in the first address range, and generate a warning notification if the integrity verification detects an error in the first address range.

Example 13 includes the semiconductor apparatus of any one of Examples 7 to 12, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to conduct a first copy of firmware data from a first partition in a storage device to a second partition in the storage device, detect a recovery condition with respect to the firmware data in the first partition, and automatically conduct a second copy of the firmware data from the second partition to the first partition in response to the recovery condition.

Example 15 includes the at least one computer readable storage medium of Example 14, wherein the firmware data is to define one or more settings for firmware code and wherein the first copy is conducted in response to a write of the firmware data to the first partition.

Example 16 includes the at least one computer readable storage medium of Example 14, wherein the instructions, when executed, further cause the computing system to determine an address range for the firmware data in the second partition based on a range descriptor, and wherein the firmware data is copied to the address range in the second partition during the first copy.

Example 17 includes the at least one computer readable storage medium of Example 14, wherein the recovery condition is detected via one or more of a user interface pin or a status register.

Example 18 includes the at least one computer readable storage medium of any one of Examples 14 to 17, wherein the instructions, when executed, further cause the computing system to conduct an integrity verification before the second copy, wherein the second copy is conducted if the integrity verification does not detect an error in a first address range containing the firmware data in the first partition or a second address range containing the firmware data in the second partition, and bypass the second copy if the integrity verification detects an error in one or more of the first address range or the second address range.

Example 19 includes the at least one computer readable storage medium of Example 18, wherein the instructions, when executed, further cause the computing system to map the first address range to the second address range if the integrity verification detects an error in the first address range, and generate a warning notification if the integrity verification detects an error in the first address range.

Example 20 includes a method of operating a performance-enhanced computing system, the method comprising conducting a first copy of firmware data from a first partition in a storage device to a second partition in the storage device, detecting a recovery condition with respect to the firmware data in the first partition, and automatically conducting a second copy of the firmware data from the second partition to the first partition in response to the recovery condition.

Example 21 includes the method of Example 20, wherein the firmware data defines one or more settings for firmware code and the first copy is conducted in response to a write of the firmware data to the first partition.

Example 22 includes the method of Example 20, further including determining an address range for the firmware data in the second partition based on a range descriptor, wherein the firmware data is copied to the address range in the second partition during the first copy.

Example 23 includes the method of Example 20, wherein the recovery condition is detected via one or more of a user interface pin or a status register.

Example 24 includes the method of any one of Examples 20 to 23, further including conducting an integrity verification before the second copy, wherein the second copy is conducted if the integrity verification does not detect an error in a first address range containing the firmware data in the first partition or a second address range containing the firmware data in the second partition, and bypassing the second copy if the integrity verification detects an error in one or more of the first address range or the second address range.

Example 25 includes the method of Example 24, further including mapping the first address range to the second address range if the integrity verification detects an error in the first address range, and generating a warning notification if the integrity verification detects an error in the first address range.

Example 26 includes means for performing the method of any one of Examples 20 to 24.

Thus, technology described herein may provide for a recovered system that does not need to be re-provisioned. Accordingly, IT (information technology) administrators may continue uninterrupted remote support after a recovery operation. Other examples of data that may be preserved if lost or corrupted include CSE file systems, UEFI variables (e.g., secure boot status and keys), soft straps, sensor calibration data, data center settings, and so forth. Moreover, firmware data stored in the active partition may be used at runtime. For data center use cases, if the data is corrupt, control logic may trigger a partition switch pin and restore the mirror region data to the active partition during runtime.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a non-volatile storage device including a first partition and a second partition;
a processor; and
a memory including a set of executable program instructions, which when executed by the processor, cause the processor to:
conduct a first copy of firmware data from the first partition to the second partition,
detect a recovery condition with respect to the firmware data in the first partition,
detect whether a first error is present in a first address range containing the firmware data in the first partition,
detect whether a second error is present in a second address range containing the firmware data in the second partition,
determine that a second copy is to be conducted if each of the first error and the second error is not detected, wherein the second copy is to copy the firmware data from the second partition to the first partition,
bypass the second copy if one or more of the first error is detected or the second error is detected, and
automatically conduct the second copy of the firmware data from the second partition to the first partition in response to the recovery condition and the second copy being determined to be conducted.

2. The computing system of claim 1, wherein the firmware data is to define one or more settings for firmware code and wherein the first copy is conducted in response to a write of the firmware data to the first partition.

3. The computing system of claim 1, wherein the instructions, when executed, further cause the processor to determine an address range for the firmware data in the second partition based on a range descriptor, and wherein the firmware data is copied to the address range in the second partition during the first copy.

4. The computing system of claim 1, wherein the recovery condition is detected via one or more of a user interface pin or a status register.

5. The computing system of claim 1, wherein the instructions, when executed, further cause the processor to:
map the first address range to the second address range if an error is detected in the first address range; and
generate a warning notification if an error is detected in the first address range.

6. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
conduct a first copy of firmware data from a first partition in a storage device to a second partition in the storage device;
detect a recovery condition with respect to the firmware data in the first partition;
detect whether a first error is present in a first address range containing the firmware data in the first partition;
detect whether a second error is present in a second address range containing the firmware data in the second partition;
determine that a second copy is to be conducted if each of the first error and the second error is not detected, wherein the second copy is to copy the firmware data from the second partition to the first partition;
bypass the second copy if one or more of the first error is detected or the second error is detected; and
automatically conduct the second copy of the firmware data from the second partition to the first partition in response to the recovery condition and the second copy being determined to be conducted.

7. The semiconductor apparatus of claim 6, wherein the firmware data is to define one or more settings for firmware code and wherein the first copy is conducted in response to a write of the firmware data to the first partition.

8. The semiconductor apparatus of claim 6, wherein the logic coupled to the one or more substrates is to determine an address range for the firmware data in the second partition based on a range descriptor, and wherein the firmware data is copied to the address range in the second partition during the first copy.

9. The semiconductor apparatus of claim 6, wherein the recovery condition is detected via one or more of a user interface pin or a status register.

10. The semiconductor apparatus of claim 6, wherein the logic coupled to the one or more substrates is to:
map the first address range to the second address range if an error is detected in the first address range; and
generate a warning notification if an error is detected in the first address range.

11. The semiconductor apparatus of claim 6, wherein the logic coupled to the one or more substrates includes transistor channel regions that are positioned within the one or more substrates.

12. At least one non-transitory computer readable storage medium comprising a set of executable program instructions, which when executed by a computing system, cause the computing system to:
- conduct a first copy of firmware data from a first partition in a storage device to a second partition in the storage device;
- detect a recovery condition with respect to the firmware data in the first partition;
- detect whether a first error is present in a first address range containing the firmware data in the first partition;
- detect whether a second error is present in a second address range containing the firmware data in the second partition;
- determine that a second copy is to be conducted if each of the first error and the second error is not detected, wherein the second copy is to copy the firmware data from the second partition to the first partition;
- bypass the second copy if one or more of the first error is detected or the second error is detected; and
- automatically conduct the second copy of the firmware data from the second partition to the first partition in response to the recovery condition and the second copy being determined to be conducted.

13. The at least one non-transitory computer readable storage medium of claim 12, wherein the firmware data is to define one or more settings for firmware code and wherein the first copy is conducted in response to a write of the firmware data to the first partition.

14. The at least one non-transitory computer readable storage medium of claim 12, wherein the instructions, when executed, further cause the computing system to determine an address range for the firmware data in the second partition based on a range descriptor, and wherein the firmware data is copied to the address range in the second partition during the first copy.

15. The at least one non-transitory computer readable storage medium of claim 12, wherein the recovery condition is detected via one or more of a user interface pin or a status register.

16. The at least one non-transitory computer readable storage medium of claim 12, wherein the instructions, when executed, further cause the computing system to:
- map the first address range to the second address range if an error is detected in the first address range; and
- generate a warning notification if an error is detected in the first address range.

17. A method comprising:
- conducting a first copy of firmware data from a first partition in a storage device to a second partition in the storage device;
- detecting a recovery condition with respect to the firmware data in the first partition;
- detecting whether a first error is present in a first address range containing the firmware data in the first partition;
- detecting whether a second error is present in a second address range containing the firmware data in the second partition;
- determining that a second copy is to be conducted if each of the first error and the second error is not detected, wherein the second copy copies the firmware data from the second partition to the first partition;
- bypassing the second copy if one or more of the first error is detected or the second error is detected; and
- automatically conducting the second copy of the firmware data from the second partition to the first partition in response to the recovery condition and the second copy being determined to be conducted.

18. The method of claim 17, wherein the firmware data defines one or more settings for firmware code and the first copy is conducted in response to a write of the firmware data to the first partition.

19. The method of claim 17, further including determining an address range for the firmware data in the second partition based on a range descriptor, wherein the firmware data is copied to the address range in the second partition during the first copy.

20. The method of claim 17, wherein the recovery condition is detected via one or more of a user interface pin or a status register.

21. The method of claim 17, further including:
- mapping the first address range to the second address range if an error is detected in the first address range; and
- generating a warning notification if an error is detected in the first address range.

* * * * *